(12) United States Patent
Yan et al.

(10) Patent No.: US 11,560,879 B2
(45) Date of Patent: Jan. 24, 2023

(54) SOLAR-AIDED COAL-FIRED FLEXIBLE POWER GENERATION SYSTEM AND OPERATION METHOD THEREOF

(71) Applicant: XI'AN JIAOTONG UNIVERSITY, Shaanxi (CN)

(72) Inventors: Hui Yan, Shaanxi (CN); Ming Liu, Shaanxi (CN); Daotong Chong, Shaanxi (CN); Jinshi Wang, Shaanxi (CN); Weixiong Chen, Shaanxi (CN); Junjie Yan, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 4 days.

(21) Appl. No.: 17/427,644

(22) PCT Filed: Jun. 22, 2019

(86) PCT No.: PCT/CN2019/092429
§ 371 (c)(1),
(2) Date: Aug. 1, 2021

(87) PCT Pub. No.: WO2020/181677
PCT Pub. Date: Sep. 17, 2020

(65) Prior Publication Data
US 2022/0099071 A1    Mar. 31, 2022

(30) Foreign Application Priority Data
Mar. 11, 2019 (CN) .......................... 201910181982.1

(51) Int. Cl.
*F03G 6/06* (2006.01)
*F01D 15/10* (2006.01)
*F01K 11/02* (2006.01)

(52) U.S. Cl.
CPC ............. *F03G 6/067* (2013.01); *F01D 15/10* (2013.01); *F01K 11/02* (2013.01)

(58) Field of Classification Search
CPC .......... F03G 6/067; F01D 15/10; F01K 11/02; F01K 13/00; F01K 13/02; Y02E 10/46; Y02E 20/14
(Continued)

(56) References Cited

U.S. PATENT DOCUMENTS 10,968,784 B2 * 4/2021 Yan .......................... F01D 15/10
2009/0125152 A1 * 5/2009 Skowronski .............. F01K 7/40
60/659
(Continued)

FOREIGN PATENT DOCUMENTS

CN    102110125 A    7/2011

*Primary Examiner* — Hoang M Nguyen

(57) ABSTRACT

A solar-aided coal-fired flexible power generation system and an operating method thereof are provided. The system includes a coal-fired thermal power generation system and a high-temperature heat storage system coupled with solar thermal power generation; wherein a heat storage medium heater is arranged in the boiler flue; the flow rates of heat storage medium entering the solar heat collection device and the heat storage medium heater are adjusted by the regulating valve and the pump, eliminating irradiation fluctuation influences and maintaining stable power; a heat storage medium tank is used for peak shaving to reduce steam turbine output under stable boiler combustion; the flow and temperature of the feedwater entering the heat storage medium and feedwater heat exchanger are adjusted to realize rapid load cycling. The present invention can realize solar and coal-fired generation coupling, reduce coal consumption, and greatly improve the flexibility and economy.

6 Claims, 1 Drawing Sheet

(58) Field of Classification Search
USPC .......... 60/641.8–641.15, 659, 653, 677–679
See application file for complete search history.

(56) References Cited

U.S. PATENT DOCUMENTS

2014/0290247 A1* 10/2014 Mishima ................ F03G 6/067
  60/641.9
2021/0310365 A1* 10/2021 Yan ........................ F22D 1/50

* cited by examiner

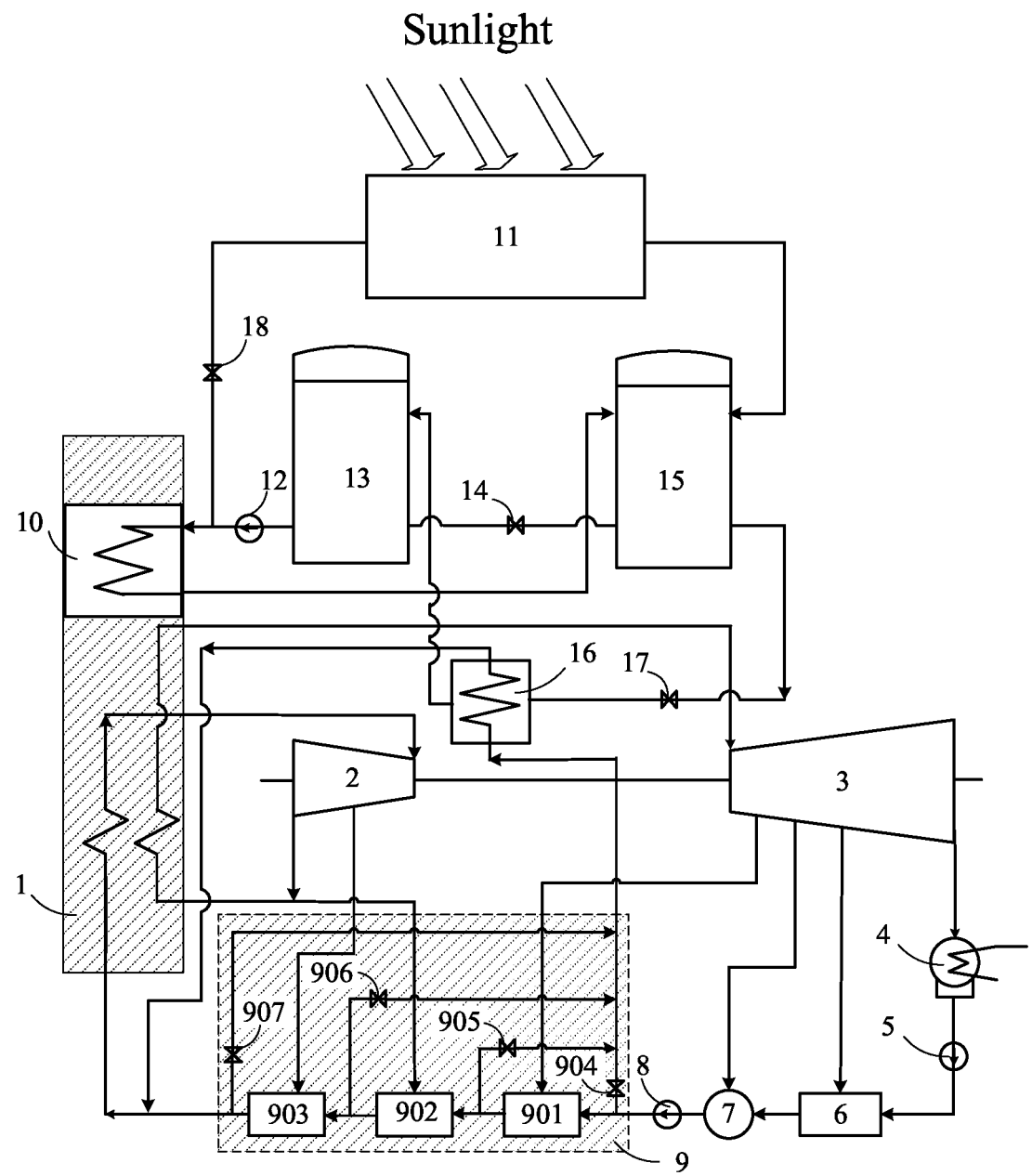

SOLAR-AIDED COAL-FIRED FLEXIBLE POWER GENERATION SYSTEM AND OPERATION METHOD THEREOF

BACKGROUND OF THE PRESENT INVENTION

Field of Invention

The invention relates to the technical field of integrated energy power generation, and more particular to a solar-aided coal-fired flexible power generation system and an operation method thereof.

Description of Related Arts

In recent years, the Chinese government has accelerated the construction of integrated energy demonstration projects. Solar energy is clean and renewable energy, but since solar energy is intermittent energy, combining its power generation in a large scale to the power grid aggravates the fluctuations of power grid and also reduces the peak shaving capacity ratio of the power grid, which causes difficulties in renewable energy power consumption in some areas of China; meanwhile, the peak shaving tasks in the power system of China will be mainly undertaken by coal-fired thermal power units. This puts forward new requirements for the flexibility and the economy of solar thermal power generation and coal-fired thermal power units, such as being able to keep the output power stable while also being able to cycle load with large amplitude rapidly and operate economically.

The available coupling of the solar thermal power generation system and the coal-fired thermal power generation system is not enough to quickly compensate the output power disturbance caused by the change of the solar radiation intensity, and the strong coupling between the boiler and the steam turbine limits the minimum output of the coal-fired thermal power units. However, there is no effective solution yet to enable solar thermal power generation and coal-fired thermal power units to meet the requirements of power grid for load cycling performance and economy of the coal-fired thermal power units. The problems that need to be solved include:

1) When environmental condition such as solar radiation changes, the operational control problems of solar-aided coal-fired power plants need to be solved.

2) When the power grid requires rapid load cycling with a large amplitude, the solar thermal power generation is limited by the weather, while the coal-fired power generation is limited by the minimum stable combustion load of the boiler and the internal heat storage capacity of the coal-fired thermal power generation system, which cannot meet the requirements of the load cycling rate, and it is necessary to seek more potential solutions of coupling solar energy and coal-fired thermal power generation coordinated with the addition of a more efficient heat storage system.

SUMMARY OF THE PRESENT INVENTION

In order to solve the above-mentioned problems in the prior art, the purpose of the present invention is to provide a solar-aided coal-fired flexible power generation system and an operation method thereof, which realizes the coupling of solar thermal power generation and coal-fired thermal power generation, adds the external active heat storage to the coal-fired thermal power unit, and utilizes the storage medium to store heat in high temperature, so as to quickly compensate the output power disturbance caused by the change of the solar radiation intensity and realize the decoupling of the boiler and the steam turbine, so that the solar-aided coal-fired power generation system can meet the requirements of the power grid for the load cycling performance, reduce coal consumption and improve economical efficiency.

In order to achieve the above objective, the present invention adopts technical solutions as follows.

A solar-aided coal-fired flexible power generation system, comprises: a coal-fired thermal power generation system and a high-temperature heat storage system coupled with solar thermal power generation; wherein:

the coal-fired thermal power generation system comprises a boiler, a steam turbine high pressure cylinder, a steam turbine middle and low pressure cylinder, a condenser, a condensate pump, a low pressure heater, a deaerator, a feedwater pump and a high pressure heater and regulating valve group which are connected in sequence; wherein a heat storage medium heater is also arranged in a flue of the boiler; a superheated steam outlet of the boiler is connected with an inlet of the steam turbine high pressure cylinder; a feedwater inlet of the boiler is connected with a feedwater outlet of the high pressure heater and regulating valve group; a steam outlet of the steam turbine high pressure cylinder is connected with a steam inlet of the steam turbine middle and low pressure cylinder via the boiler; a first-stage steam extraction outlet of the steam turbine middle and low pressure cylinder is connected with a steam inlet of the high pressure heater and regulating valve group through a pipeline, and a second-stage steam extraction outlet of the steam turbine middle and low pressure cylinder is connected with a steam inlet of the deaerator through a pipeline, and a third-stage steam extraction outlet of the steam turbine middle and low pressure cylinder is connected with a steam inlet of the low pressure heater through a pipeline; a steam outlet of the steam turbine middle and low pressure cylinder is connected with a steam inlet of the condenser; a water working fluid outlet of the condenser is connected with a water working fluid inlet of the low pressure heater through the condensate pump; a water working fluid outlet of the low pressure heater is connected with a water working fluid inlet of the deaerator; and the high-temperature heat storage system coupled with solar thermal power generation comprises a solar heat collection device, a heat storage medium pump, a cold heat storage medium tank, a cold-hot heat storage medium tank connection valve, a hot heat storage medium tank, a hot heat storage medium tank outlet regulating valve and a heat storage medium and feedwater heat exchanger which are connected in sequence, further comprising a solar heat storage medium regulating valve; an inlet of the solar heat collection device is connected to a cold heat storage medium outlet of the cold heat storage medium tank through the solar heat storage medium regulating valve and the heat storage medium pump; the cold heat storage medium outlet of the cold heat storage medium tank is also connected with an inlet of the heat storage medium heater through the heat storage medium pump; an outlet of the solar heat collection device is connected to a right inlet of the hot heat storage medium of the hot heat storage medium tank through a pipeline; an outlet of the heat storage medium heater is connected with a left inlet of the hot heat storage medium of the hot heat storage medium tank through a pipeline; a heat storage medium outlet of the heat storage medium and feedwater heat exchanger is connected with a cold heat storage medium inlet of the cold heat storage medium tank through a pipeline, and a heat storage medium inlet of the heat storage medium and feedwater heat exchanger is connected to an outlet of the hot heat storage medium tank through the heat storage medium tank outlet regulating valve; a feedwater outlet of the heat storage medium and feedwater heat exchanger is connected to the feedwater inlet of the boiler through a pipeline; a feedwater inlet of the heat storage medium and feedwater heat exchanger is connected to a water working fluid outlet of the feedwater pump; the cold heat storage medium tank and the hot heat storage medium tank of the high-temperature heat storage system are connected via the cold-hot heat storage medium tank connection valve.

Preferably, the high pressure heater and regulating valve group is arranged with a first-stage high pressure heater, a second-stage high pressure heater and a third-stage high pressure heater, and also comprises a first-stage high pressure heater inlet regulating valve, a second-stage high pressure heater inlet regulating valve, a third-stage high pressure heater inlet regulating valve and a third-stage high pressure heater outlet regulating valve; wherein a feedwater outlet of the third-stage high pressure heater is the feedwater outlet of the high pressure heater and regulating valve group; a feedwater inlet of the first-stage high pressure heater is a feedwater inlet of the high pressure heater and regulating valve group; and a feedwater outlet of the first-stage high pressure heater is connected with a feedwater inlet of the second-stage high pressure heater through a pipeline; a feedwater outlet of the second-stage high pressure heater is connected with a feedwater inlet of the third-stage high pressure heater through a pipeline; the steam outlet of the steam turbine high pressure cylinder is connected to a superheated steam inlet of the second-stage high pressure heater through a pipeline; a first-stage steam extraction outlet of the steam turbine high pressure cylinder is connected with a steam inlet of the third-stage high pressure heater through a pipeline; a first-stage steam extraction outlet of the steam turbine middle and low pressure cylinder is connected with a steam inlet of the first-stage high pressure heater through a pipeline.

Preferably, the feedwater inlet of the heat storage medium and feedwater heat exchanger is connected with the feedwater inlet of the first-stage high pressure heater through the first-stage high pressure heater inlet regulating valve, and is connected with the feedwater inlet of the second-stage high pressure heater through the second-stage high pressure heater inlet regulating valve, and is connected with the feedwater inlet of the third-stage high pressure heater through the third-stage high pressure heater inlet regulating valve, and is also connected with the feedwater outlet of the third-stage high pressure heater through the third-stage high pressure heater outlet regulating valve; the feedwater outlet of the heat storage medium and feedwater heat exchanger is also connected with the feedwater outlet of the third-stage high pressure heater.

Preferably, the heat storage medium used in the high-temperature heat storage system coupled with solar thermal power generation is the single-phase flow medium such as molten salt or heat transfer oil.

Preferably, the temperature of the flue gas at the flue of the boiler where the heat storage medium heater is located is between 550° C. and 700° C.

Also, the present invention provides an operation method of the solar-aided coal-fired flexible power generation system, which comprises steps of: in order to maintain the stable output power of the steam turbine when the solar radiation condition changes, maintaining the stable working conditions of the heat storage medium and feedwater heat exchanger, that is, maintaining the flow rate of the heat storage medium entering the heat storage medium and feedwater heat exchanger and the flowrate and temperature of the feedwater entering the heat storage medium and feedwater heat exchanger all unchanged; when the capacity of the hot heat storage medium tank is insufficient, increasing the amount of heat storage medium that enters the heat storage medium heater; when the solar irradiation is sufficient and the coal-fired thermal power system needs to be up load, increasing the flow rate of the heat storage medium entering the solar heat collection device by adjusting the solar heat storage medium regulating valve and heat storage medium pump, and stopping the heat storage medium entering the heat storage medium heater, opening the heat storage medium tank outlet regulating valve at the same time, and adjusting the heat storage medium flow rate into the heat storage medium and feedwater heat exchanger through the heat storage medium tank outlet regulating valve, and opening or closing one or more valves among the first-stage high pressure heater inlet regulating valve, the second-stage high pressure heater inlet regulating valve, the third-stage high pressure heater inlet regulating valve, and the third-stage high pressure heater outlet regulating valve to adjust the flow rate and temperature of the feedwater entering the heat storage medium and feedwater heat exchanger; the adjustment goal is to increase the feedwater temperature and make the change rates of the main steam flow rate entering the steam turbine high pressure cylinder from the boiler and the reheated steam flow rate entering the steam turbine middle and low pressure cylinder be able to meet the electromechanical load change rate of the steam turbine, so as to lead the solar-aided coal-fired flexible power generation system meeting the requirements of rapid load cycling rate; when the coal-fired thermal power system needs to reduce the load, turning off the first-stage high pressure heater inlet regulating valve, the second-stage high pressure heater inlet regulating valve, the third-stage high pressure heater inlet regulating valve and the third-stage high pressure heater outlet regulating valve, opening the cold-hot heat storage medium tank connection valve and the solar heat storage medium regulating valve, starting the heat storage medium pump, and adjusting the flow rate of the cold heat storage medium that enters the heat storage medium heater for heat exchange with the high-temperature flue gas and the flow rate of the heat storage medium that enters and heats in the solar heat collection device by cooperation between the heat storage medium pump and the solar heat storage medium regulating valve; the heated heat storage medium entering the hot heat storage medium tank respectively from the left and right inlets of the hot heat storage medium tank; and adjusting the mass balance of the storage heat medium in the cold heat storage medium tank and the hot heat storage medium tank through the cold-hot heat storage medium tank connection valve, and the adjustment goal is to reduce the output of the steam turbine under the condition of stable combustion of the boiler, while effectively storing solar heat.

Compared with the prior art, the present invention has the following advantages:

(1) The present invention realizes the coupling of the solar thermal power generation and the coal-fired power generation by adding the external high-temperature heat storage of the coal-fired thermal power unit, which not only quickly compensates the output power disturbance caused by the change of the solar radiation intensity and maintains the stable output of the steam turbine, but also realizes the decoupling of the steam turbine and the boiler, which greatly improves the operational flexibility of the solar-aided coal-fired power generation system.

(2) The present invention can control the flow rates of the heat storage medium into the solar heat collection device and the heat storage medium heater, utilize the solar energy, reduce the coal consumption, and improve the economy; at the same time, the heat storage medium stores the remaining high-quality energy outside the coal-fired thermal power unit after satisfying the load of the steam turbine during the low-load operation, so as to enhance the low-load operation capacity of the solar-aided coal-fired power generation system and improve the energy utilization efficiency.

(3) The present invention can adjust the flow rate and temperature of the feedwater entering the heat storage medium and feedwater heat exchanger through opening and closing of the high pressure heater regulating valve group, so that the solar-aided coal-fired power generation system can meet the rapid load cycling rate requirements of the coal-fired thermal power unit; through the heat medium exchanging heat outside the coal-fired thermal power unit, the feedwater temperature is increased, thereby improving the rapid load cycling capability of the coal-fired thermal power unit.

BRIEF DESCRIPTION OF THE DRAWINGS

The FIGURE is a schematic diagram of the solar-aided coal-fired flexible power generation system according to a preferred embodiment of the present invention.

DETAILED DESCRIPTION OF THE PREFERRED EMBODIMENT

The present invention is further described in detail with the accompanying drawing and the preferred embodiment.

As shown in the FIGURE, according to the preferred embodiment of the present invention, a solar-aided coal-fired flexible power generation system comprises: a coal-fired thermal power generation system and a high-temperature heat storage system coupled with solar thermal power generation; wherein:

the coal-fired thermal power generation system comprises a boiler 1, a steam turbine high pressure cylinder 2, a steam turbine middle and low pressure cylinder 3, a condenser 4, a condensate pump 5, a low pressure heater 6, a deaerator 7, a feedwater pump 8 and a high pressure heater and regulating valve group 9 which are connected in sequence; wherein a heat storage medium heater 10 is also arranged in a flue of the boiler 1; a superheated steam outlet of the boiler 1 is connected with an inlet of the steam turbine high pressure cylinder 2; a feedwater inlet of the boiler 1 is connected with a feedwater outlet of the high pressure heater and regulating valve group 9; a steam outlet of the steam turbine high pressure cylinder 2 is connected with a steam inlet of the steam turbine middle and low pressure cylinder 3 of the steam turbine via the boiler 1; a first-stage steam extraction outlet of the steam turbine middle and low pressure cylinder 3 of the steam turbine is connected with a steam inlet of the high pressure heater and regulating valve group 9 through a pipeline, and a second-stage steam extraction outlet of the steam turbine middle and low pressure cylinder 3 is connected with a steam inlet of the deaerator 7 through a pipeline, and a third-stage steam extraction outlet of the steam turbine middle and low pressure cylinder 3 is connected with a steam inlet of the low pressure heater 6 through a pipeline; a steam outlet of the steam turbine middle and low pressure cylinder 3 is connected with a steam inlet of the condenser 4; a water working fluid outlet of the condenser 4 is connected with a water working fluid inlet of the low pressure heater 6 through the condensate pump 5; a water working fluid outlet of the low pressure heater 6 is connected with a water working fluid inlet of the deaerator 7; and the high-temperature heat storage system coupled with solar thermal power generation comprises a solar heat collection device 11, a heat storage medium pump 12, a cold heat storage medium tank (13, a cold-hot heat storage medium tank connection valve 14, a hot heat storage medium tank 15, a thermal storage medium tank outlet regulating valve 17 and a heat storage medium and feedwater heat exchanger 16 which are connected in sequence, further comprising a solar heat storage medium regulating valve 18; an inlet of the solar heat collection device 11 is connected to a cold heat storage medium outlet of the cold heat storage medium tank 13 through the solar heat storage medium regulating valve 18 and the heat storage medium pump 12; the cold heat storage medium outlet of the cold heat storage medium tank 13 is also connected with an inlet of the heat storage medium heater 10 through the heat storage medium pump 12; an outlet of the solar heat collection device 11 is connected to a right inlet of the hot heat storage medium of the hot heat storage medium tank 15 through a pipeline; an outlet of the heat storage medium heater 10 is connected with a left inlet of the hot heat storage medium of the hot heat storage medium tank 15 through a pipeline; a heat storage medium outlet of the heat storage medium and feedwater heat exchanger 16 is connected with a cold heat storage medium inlet of the cold heat storage medium tank 13 through a pipeline, and a heat storage medium inlet of the heat storage medium and feedwater heat exchanger 16 is connected to an outlet of the hot heat storage medium tank 15 through the heat storage medium tank outlet regulating valve 17; a feedwater outlet of the heat storage medium and feedwater heat exchanger 16 is connected to the feedwater inlet of the boiler 1 through a pipeline; a feedwater inlet of the heat storage medium and feedwater heat exchanger 16 is connected to a water working fluid outlet of the feedwater pump 8; the cold heat storage medium tank 13 and the hot heat storage medium tank 15 of the high-temperature heat storage system are connected via the cold-hot heat storage medium tank connection valve 14.

Preferably, the high pressure heater and regulating valve group 9 is arranged with a first-stage high pressure heater 901, a second-stage high pressure heater 902 and a third-stage high pressure heater 903, and also comprises a first-stage high pressure heater inlet regulating valve 904, a second-stage high pressure heater inlet regulating valve 905, a third-stage high pressure heater inlet regulating valve 906 and a third-stage high pressure heater outlet regulating valve 907; wherein a feedwater outlet of the third-stage high pressure heater 903 is the feedwater outlet of the high pressure heater and regulating valve group 9; a feedwater inlet of the first-stage high pressure heater 901 is a feedwater inlet of the high pressure heater and regulating valve group 9; and a feedwater outlet of the first-stage high pressure heater 901 is connected with a feedwater inlet of the second-stage high pressure heater 902 through a pipeline; a feedwater outlet of the second-stage high pressure heater 902 is connected with a feedwater inlet of the third-stage high pressure heater 903 through a pipeline; the steam outlet of the steam turbine high pressure cylinder 2 is connected to a superheated steam inlet of the second-stage high pressure heater 902 through a pipeline; a first-stage steam extraction outlet of the steam turbine high pressure cylinder 2 is connected with a steam inlet of the third-stage high pressure heater 903 through a pipeline; a first-stage steam extraction outlet of the steam turbine middle and low pressure cylinder 3 is connected with a steam inlet of the first-stage high pressure heater 901 through a pipeline.

Preferably, the feedwater inlet of the heat storage medium and feedwater heat exchanger 16 is connected with the feedwater inlet of the first-stage high pressure heater 901 through the first-stage high pressure heater inlet regulating valve 904, and is connected with the feedwater inlet of the second-stage high pressure heater 902 through the two-stage high pressure heater inlet regulating valve 905, and is connected with the feedwater inlet of the third-stage high pressure heater 903 through the third-stage high pressure heater inlet regulating valve 906, and is also connected with the feedwater outlet of the third-stage high pressure heater 903 through the third-stage high pressure heater outlet regulating valve 907; the feedwater outlet of the heat storage medium and feedwater heat exchanger 16 is also connected with the feedwater outlet of the third-stage high pressure heater 903; the advantage is that the flow rate and the temperature of feedwater entering the heat storage medium and feedwater heat exchanger 16 can be flexibly adjusted, so as to improve the flexibility of the coal-fired thermal power unit by increasing the load cycling rate of the coal-fired thermal power unit.

Preferably, the heat storage medium used in the high-temperature heat storage system coupled with solar thermal power generation is the single-phase flow medium such as molten salt or heat transfer oil, so as to ensure the single-phase flow in the heat exchanger to improve the safety and stability of the system.

Preferably, the temperature of the flue gas at the flue of the boiler 1 where the heat storage medium heater 10 is located is between 550° C. and 700° C., so as to ensure the heat storage medium stored the high-quality heat.

An operation method of the solar-aided coal-fired flexible power generation system provided by the present invention shown in the FIGURE comprises steps of: in order to maintain the stable output power of the steam turbine when the solar radiation condition changes, maintaining the stable working conditions of the heat storage medium and feedwater heat exchanger 16, that is, maintaining the flow rate of the heat storage medium entering the heat storage medium and feedwater heat exchanger 16 and the flowrate and temperature of the feedwater entering the heat storage medium and feedwater heat exchanger 16 all unchanged; when the capacity of the hot heat storage medium tank 15 is insufficient, increasing the amount of heat storage medium that enters the heat storage medium heater 10; when the solar irradiation is sufficient and the coal-fired thermal power system needs to be up load, increasing the flow rate of the heat storage medium entering the solar heat collection device 11 by adjusting the solar heat storage medium regulating valve 18 and heat storage medium pump 12, and stopping the heat storage medium entering the heat storage medium heater 10, opening the heat storage medium tank outlet regulating valve 17 at the same time, and adjusting the heat storage medium flow rate into the heat storage medium and feedwater heat exchanger 16 through the heat storage medium tank outlet regulating valve 17; and opening or closing one or more valves among the first-stage high pressure heater inlet regulating valve 904, the second-stage high pressure heater inlet regulating valve 905, the third-stage high pressure heater inlet regulating valve 906, and the third-stage high pressure heater outlet regulating valve 907 to adjust the flow rate and temperature of the feedwater entering the heat storage medium and feedwater heat exchanger 16; the adjustment goal is to increase the feedwater temperature and make the change rates of the main steam flow rate entering the steam turbine high pressure cylinder 2 from the boiler 1 and the reheated steam flow rate entering the steam turbine middle and low pressure cylinder 3 be able to meet the electromechanical load change rate of the steam turbine, so as to lead the solar-aided coal-fired flexible power generation system meeting the requirements of rapid load cycling rate; when the coal-fired thermal power system needs to reduce the load, turning off the first-stage high pressure heater inlet regulating valve 904, the second-stage high pressure heater inlet regulating valve 905, the third-stage high pressure heater inlet regulating valve 906 and the third-stage high pressure heater outlet regulating valve 907, opening the cold-hot heat storage medium tank connection valve 14 and the solar heat storage medium regulating valve 18, starting the heat storage medium pump 12, and adjusting the flow rate of the cold heat storage medium that enters the heat storage medium heater 10 for heat exchange with the high-temperature flue gas and the flow rate of the heat storage medium that enters and heats in the solar heat collection device 11 by cooperation between the heat storage medium pump 12 and the solar heat storage medium regulating valve (18); the heated heat storage medium entering the hot heat storage medium tank 15 respectively from the left and right inlets of the hot heat storage medium tank 15; and adjusting the mass balance of the storage heat medium in the cold heat storage medium tank 13 and the hot heat storage medium tank 15 through the cold-hot heat storage medium tank connection valve 14, and the adjustment goal is to reduce the output of the steam turbine under the condition of stable combustion of the boiler 1, while effectively storing solar heat.

The present invention uses the high-temperature heat storage system coupled with solar thermal power generation and the coal-fired power generation thermal system to quickly compensate the output power disturbance caused by the change of the solar radiation intensity; when environmental condition such as solar irradiance changes, the stable output of the steam turbine is kept through maintaining the stabilized working conditions of the heat storage medium and feedwater heat exchanger 16; the high-temperature heat storage system runs in parallel outside the coal-fired power generation thermal system, breaking the strong coupling between the boiler and the steam turbine of the coal-fired thermal power unit; when the solar irradiation is sufficient and the coal-fired thermal power system needs to quickly increase the load, adjusting the solar heat storage medium regulating valve 18 to control the heat storage medium flow rate entering into the solar heat collection device 11, regulating one or more among the first-stage high pressure heater inlet regulating valve 904, the second-stage high pressure heater inlet regulating valve 905, and the third-stage high pressure heater inlet regulating valve 906 and the third-stage high pressure heater outlet regulating valve 907 to control the temperature and flow rate of feedwater entering the heat storage medium and feedwater heat exchanger 16, and exchanging heat with the heat storage medium outside the coal-fired thermal power unit to increase the feedwater temperature and improve the rapid load cycling operation capability of the coal-fired thermal power unit, while using solar energy to reduce the coal consumption; when the steam turbine requires to operate with low load, adjusting the heat storage medium flow rate into the heat storage medium and feedwater heat exchanger 16 so that the boiler combustion capacity can be kept as unchanged as possible, and adopting the heat storage medium to store the remaining high-quality energy outside the coal-fired thermal power unit after meeting the load of the steam turbine, improving the minimum load operation capacity of the coal-fired power generation system. The present invention can solve the problems of insufficient flexibility and economy when solar thermal power generation and coal-fired power generation thermal units participate in peak shaving.

What is claimed is:

1. A solar-aided coal-fired flexible power generation system, comprising: a coal-fired thermal power generation system and a high-temperature heat storage system coupled with solar thermal power generation; wherein:

the coal-fired thermal power generation system comprises a boiler (1), a steam turbine high pressure cylinder (2), a steam turbine middle and low pressure cylinder (3), a condenser (4), a condensate pump (5), a low pressure heater (6), a deaerator (7), a feedwater pump (8) and a high pressure heater and regulating valve group (9) which are connected in sequence; wherein a heat storage medium heater (10) is also arranged in a flue of the boiler (1); a superheated steam outlet of the boiler (1) is connected with an inlet of the steam turbine high pressure cylinder (2); a feedwater inlet of the boiler (1) is connected with a feedwater outlet of the high pressure heater and regulating valve group (9); a steam outlet of the steam turbine high pressure cylinder (2) is connected with a steam inlet of the steam turbine middle and low pressure cylinder (3) of the steam turbine via the boiler (1); a first-stage steam extraction outlet of the steam turbine middle and low pressure cylinder (3) of the steam turbine is connected with a steam inlet of the high pressure heater and regulating valve group (9) through a pipeline, and a second-stage steam extraction outlet of the steam turbine middle and low pressure cylinder (3) is connected with a steam inlet of the deaerator (7) through a pipeline, and a third-stage steam extraction outlet of the steam turbine middle and low pressure cylinder (3) is connected with a steam inlet of the low pressure heater (6) through a pipeline; a steam outlet of the steam turbine middle and low pressure cylinder (3) is connected with a steam inlet of the condenser (4); a water working fluid outlet of the condenser (4) is connected with a water working fluid inlet of the low pressure heater (6) through the condensate pump (5); a water working fluid outlet of the low pressure heater (6) is connected with a water working fluid inlet of the deaerator (7); and the high-temperature heat storage system coupled with solar thermal power generation comprises a solar heat collection device (11), a heat storage medium pump (12), a cold heat storage medium tank (13), a cold-hot heat storage medium tank connection valve (14), a hot heat storage medium tank (15), a thermal storage medium tank outlet regulating valve (17) and a heat storage medium and feedwater heat exchanger (16) which are connected in sequence, further comprising a solar heat storage medium regulating valve (18); an inlet of the solar heat collection device (11) is connected to a cold heat storage medium outlet of the cold heat storage medium tank (13) through the solar heat storage medium regulating valve (18) and the heat storage medium pump (12); the cold heat storage medium outlet of the cold heat storage medium tank (13) is also connected with an inlet of the heat storage medium heater (10) through the heat storage medium pump (12); an outlet of the solar heat collection device (11) is connected to a right inlet of the hot heat storage medium of the hot heat storage medium tank (15) through a pipeline; an outlet of the heat storage medium heater (10) is connected with a left inlet of the hot heat storage medium of the hot heat storage medium tank (15) through a pipeline; a heat storage medium outlet of the heat storage medium and feedwater heat exchanger (16) is connected with a cold heat storage medium inlet of the cold heat storage medium tank (13) through a pipeline, and a heat storage medium inlet of the heat storage medium and feedwater heat exchanger (16) is connected to an outlet of the hot heat storage medium tank (15) through the heat storage medium tank outlet regulating valve (17); a feedwater outlet of the heat storage medium and feedwater heat exchanger (16) is connected to the feedwater inlet of the boiler (1) through a pipeline; a feedwater inlet of the heat storage medium and feedwater heat exchanger (16) is connected to a water working fluid outlet of the feedwater pump (8); the cold heat storage medium tank (13) and the hot heat storage medium tank (15) of the high-temperature heat storage system are connected via the cold-hot heat storage medium tank connection valve (14).

2. The solar-aided coal-fired flexible power generation system, as recited in claim 1, wherein the high pressure heater and regulating valve group (9) is arranged with a first-stage high pressure heater (901), a second-stage high pressure heater (902) and a third-stage high pressure heater (903), and also comprises a first-stage high pressure heater inlet regulating valve (904), a two-stage high pressure heater inlet regulating valve (905), a third-stage high pressure heater inlet regulating valve (906) and a third-stage high pressure heater outlet regulating valve (907); wherein a feedwater outlet of the third-stage high pressure heater (903) is the feedwater outlet of the high pressure heater and regulating valve group (9); a feedwater inlet of the first-stage high pressure heater (901) is a feedwater inlet of the high pressure heater and regulating valve group (9); and a feedwater outlet of a first-stage high pressure heater (901) is connected with a feedwater inlet of the second-stage high pressure heater (902) through a pipeline; a feedwater outlet of the second-stage high pressure heater (902) is connected with a feedwater inlet of the third-stage high pressure heater (903) through a pipeline; the steam outlet of the steam turbine high pressure cylinder (2) is connected to a superheated steam inlet of the second-stage high pressure heater (902) through a pipeline; a first-stage steam extraction outlet of the steam turbine high pressure cylinder (2) is connected with a steam inlet of the third-stage high pressure heater (903) through a pipeline; a first-stage steam extraction outlet of the steam turbine middle and low pressure cylinder (3) is connected with a steam inlet of the first-stage high pressure heater (901) through a pipeline.

3. The solar-aided coal-fired flexible power generation system, as recited in claim 1, wherein the feedwater inlet of the heat storage medium and feedwater heat exchanger (16) is connected with the feedwater inlet of the first-stage high pressure heater (901) through the first-stage high pressure heater inlet regulating valve (904), and is connected with the feedwater inlet of the second-stage high pressure heater (902) through the second-stage high pressure heater inlet regulating valve (905), and is connected with the feedwater inlet of the third-stage high pressure heater (903) through the third-stage high pressure heater inlet regulating valve (906), and is also connected with the feedwater outlet of the third-stage high pressure heater (903) through the third-stage high pressure heater outlet regulating valve (907); the feedwater outlet of the heat storage medium and feedwater heat exchanger (16) is also connected with the feedwater outlet of the third-stage high pressure heater (903).

4. The solar-aided coal-fired flexible power generation system, as recited in claim 1, wherein the heat storage medium used in the high-temperature heat storage system coupled with solar thermal power generation is the single-phase flow medium such as molten salt or heat transfer oil.

5. The solar-aided coal-fired flexible power generation system, as recited in claim 1, wherein the temperature of the flue gas at the flue of the boiler (1) where the heat storage medium heater (10) is located is between 550° C. and 700° C.

6. An operation method of the solar-aided coal-fired flexible power generation system according to claim 1, comprising steps of: in order to maintain the stable output power of the steam turbine when the solar radiation condition changes, maintaining the stable working conditions of the heat storage medium and feedwater heat exchanger (16), that is, maintaining the flow rate of the heat storage medium entering the heat storage medium and feedwater heat exchanger (16) and the flowrate and temperature of the feedwater entering the heat storage medium and feedwater heat exchanger (16) all unchanged; when the capacity of the hot heat storage medium tank (15) is insufficient, increasing the amount of heat storage medium that enters the heat storage medium heater (10); when the solar irradiation is sufficient and the coal-fired thermal power system needs to be up load, increasing the flow rate of the heat storage medium entering the solar heat collection device (11) by adjusting the solar heat storage medium regulating valve (18) and heat storage medium pump (12), and stopping the heat storage medium entering the heat storage medium heater (10), opening the heat storage medium tank outlet regulating valve (17) at the same time, and adjusting the heat storage medium flow rate into the heat storage medium and feedwater heat exchanger (16) through the heat storage medium tank outlet regulating valve (17); and opening or closing one or more valves among the first-stage high pressure heater inlet regulating valve (904), the second-stage high pressure heater inlet regulating valve (905), the third-stage high pressure heater inlet regulating valve (906), and the third-stage high pressure heater outlet regulating valve (907) to adjust the flow rate and temperature of the feedwater entering the heat storage medium and feedwater heat exchanger (16); the adjustment goal is to increase the feedwater temperature and make the change rates of the main steam flow rate entering the steam turbine high pressure cylinder (2) from the boiler (1) and the reheated steam flow rate entering the steam turbine middle and low pressure cylinder (3) be able to meet the electromechanical load change rate of the steam turbine, so as to lead the solar-aided coal-fired flexible power generation system meeting the requirements of rapid load cycling rate; when the coal-fired thermal power system needs to reduce the load, turning off the first-stage high pressure heater inlet regulating valve (904), the second-stage high pressure heater inlet regulating valve (905), the third-stage high pressure heater inlet regulating valve (906) and the third-stage high pressure heater outlet regulating valve (907), opening the cold-hot heat storage medium tank connection valve (14) and the solar heat storage medium regulating valve (18), starting the heat storage medium pump (12), and adjusting the flow rate of the cold heat storage medium that enters the heat storage medium heater (10) for heat exchange with the high-temperature flue gas and the flow rate of the heat storage medium that enters and heats in the solar heat collection device (11) by cooperation between the heat storage medium pump (12) and the solar heat storage medium regulating valve (18); the heated heat storage medium entering the hot heat storage medium tank (15) respectively from the left and right inlets of the hot heat storage medium tank (15); and adjusting the mass balance of the storage heat medium in the cold heat storage medium tank (13) and the hot heat storage medium tank (15) through the cold-hot heat storage medium tank connection valve (14), and the adjustment goal is to reduce the output of the steam turbine under the condition of stable combustion of the boiler (1), while effectively storing solar heat.

\* \* \* \* \*